US012763451B2

(12) United States Patent
Chen

(10) Patent No.: US 12,763,451 B2
(45) Date of Patent: Oct. 13, 2026

(54) DIELECTRIC WAVEGUIDE RESONATOR AND MULTI-MODE DIELECTRIC WAVEGUIDE RESONATOR

(71) Applicant: SAMSUNG ELECTRONICS CO., LTD., Suwon-si (KR)

(72) Inventor: Zhuo Chen, Shenzhen (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 18/647,830

(22) Filed: Apr. 26, 2024

(65) Prior Publication Data

US 2024/0283123 A1 Aug. 22, 2024

Related U.S. Application Data

(63) Continuation of application No. PCT/KR2022/016098, filed on Oct. 21, 2022.

(30) Foreign Application Priority Data

Oct. 26, 2021 (CN) ......................... 202111245923.X

(51) Int. Cl.
*H01P 1/207* (2006.01)
*H01P 1/20* (2006.01)
(Continued)

(52) U.S. Cl.
CPC ............ *H01P 7/105* (2013.01); *H01P 1/2002* (2013.01); *H01P 3/16* (2013.01); *H01P 7/065* (2013.01)

(58) Field of Classification Search
CPC .......... H01P 1/2002; H01P 1/20; H01P 1/201; H01P 1/202; H01P 1/205; H01P 1/2053;
(Continued)

(56) References Cited

U.S. PATENT DOCUMENTS 5,614,875 A 3/1997 Jang et al.
10,014,564 B2 7/2018 Yatabe
(Continued)

FOREIGN PATENT DOCUMENTS

CN 208548438 U 2/2019
CN 110380164 A 10/2019
(Continued)

OTHER PUBLICATIONS

International Search Report and Written Opinion (PCT/ISA/210 and PCT/ISA/237) dated Dec. 28, 2022, issued by International Searching Authority for International Application No. PCT/KR2022/016098.

(Continued)

*Primary Examiner* — Stephen E. Jones
(74) *Attorney, Agent, or Firm* — Sughrue Mion, PLLC

(57) ABSTRACT

A dielectric waveguide resonator includes: a dielectric resonant cavity including a dielectric body and a metal plating layer wrapping an outer surface of the dielectric body; and a metal interface provided in the dielectric body and connected to the metal plating layer, where the metal interface intersects a direction of an intrinsic electric field of the dielectric resonant cavity. The dielectric waveguide resonator includes a blind hole recessed inwards from a surface of the dielectric body, where a bottom surface of the blind hole includes the metal interface, and where an axial direction of the blind hole corresponds with the direction of the intrinsic electric field of the dielectric resonant cavity.

4 Claims, 8 Drawing Sheets

(51) Int. Cl.
*H01P 3/16* (2006.01)
*H01P 7/06* (2006.01)
*H01P 7/10* (2006.01)

(58) Field of Classification Search
CPC ........ H01P 1/2056; H01P 1/207; H01P 1/208; H01P 1/2088; H01P 7/105; H01P 7/06; H01P 7/065; H01P 7/04
USPC .................................................. 333/202, 206
See application file for complete search history.

(56) References Cited

U.S. PATENT DOCUMENTS

| | | | |
|---|---|---|---|
| 2001/0024147 A1 | 9/2001 | Arakawa et al. | |
| 2004/0140871 A1 | 7/2004 | Yatabe et al. | |
| 2021/0091441 A1 | 3/2021 | Nakahori et al. | |
| 2021/0296747 A1 | 9/2021 | Jing | |
| 2023/0261353 A1* | 8/2023 | Park | H01P 1/2002 343/702 |

FOREIGN PATENT DOCUMENTS

| | | | |
|---|---|---|---|
| CN | 209487675 | U | 10/2019 |
| CN | 110600841 | A | 12/2019 |
| CN | 210224233 | U | 3/2020 |
| CN | 210326069 | U | 4/2020 |
| CN | 111682291 | A | 9/2020 |
| CN | 211879572 | U | 11/2020 |
| CN | 111478002 | B | 6/2021 |
| CN | 112151924 | B | 7/2023 |
| JP | 2015-56813 | A | 3/2015 |
| KR | 10-2016-0076019 | A | 6/2016 |
| KR | 10-2021-0015575 | A | 2/2021 |

OTHER PUBLICATIONS

Communication issued Aug. 14, 2025 by the China National Intellectual Property Administration in Chinese Patent Application No. 202111245923.X.

* cited by examiner

DIELECTRIC WAVEGUIDE RESONATOR AND MULTI-MODE DIELECTRIC WAVEGUIDE RESONATOR

CROSS REFERENCE TO RELATED APPLICATION(S)

This application is a continuation of International Application No. PCT/KR2022/016098, filed on Oct. 21, 2022, in the Korean Intellectual Property Receiving Office, which is based on and claims priority to Chinese Patent Application No. 202111245923.X, filed on Oct. 26, 2021, with the China National intellectual Property Administration, the disclosures of which are incorporated by reference herein in their entireties.

1. FIELD

The disclosure relates to the field of communications, and more particularly to a dielectric waveguide resonator and a multi-mode dielectric waveguide resonator.

2. DESCRIPTION OF RELATED ART

There are two types of resonator units commonly used for a dielectric waveguide filter: a standard rectangular waveguide TE10 mode and a quasi-TEM mode loaded with a blind hole.

The dielectric waveguide filter with the standard rectangular waveguide TE10 mode has the advantages of a high power capacity and a large unloaded Q value, but its high-order mode frequency is close to the dominant-mode frequency, and the channel bandwidth is narrow.

While the dielectric waveguide filter with the quasi-TEM mode loaded with a blind hole has an increased high-order mode frequency and a broadened channel bandwidth, its unloaded Q value is reduced. However, to compensate for a loss caused by the structure, it is necessary to increase a volume of the dielectric waveguide filter, resulting in that the size and parameters of the filter cannot be balanced.

SUMMARY

Provided is a method, and an apparatus for selecting correct SMF for SNPN UE's onboarding in a wireless network.

Further provided is a dielectric waveguide resonator and a multi-mode dielectric waveguide resonator. By adding a metal loading interface in a dielectric body of the dielectric waveguide resonator, when a size and unloaded Q value are kept constant, a dominant-mode frequency of the waveguide resonator may be reduced, a bandwidth between a high-order mode frequency and a dominant-mode frequency may increase, the performance of a low-pass filter may improve, and the loss may improve.

Additional aspects will be set forth in part in the description which follows and, in part, will be apparent from the description, or may be learned by practice of the presented embodiments.

According to an aspect of an embodiment, a dielectric waveguide resonator may include: a dielectric resonant cavity including a dielectric body and a metal plating layer wrapping an outer surface of the dielectric body; and a metal interface provided in the dielectric body and connected to the metal plating layer, where the metal interface intersects a direction of an intrinsic electric field of the dielectric resonant cavity.

The dielectric waveguide resonator may further include a blind hole recessed inwards from a surface of the dielectric body, where a bottom surface of the blind hole includes the metal interface, and where an axial direction of the blind hole corresponds with the direction of the intrinsic electric field of the dielectric resonant cavity.

The dielectric waveguide resonator may further include a first blind hole and a second blind hole, where the first blind hole and the second blind hole are respectively recessed inwards from opposite surfaces of the dielectric body, the opposite surfaces being perpendicular to the direction of the intrinsic electric field of the dielectric resonant cavity, where a bottom surface of the first blind hole includes a first metal interface, and a bottom surface of the second blind hole includes a second metal interface, where an axial direction of the first blind hole and an axial direction of the second blind hole correspond with the direction of the intrinsic electric field of the dielectric resonant cavity, and where the first metal interface and the second metal interface are separated by a distance and at least partially overlap each other in the axial direction.

A diameter of the first metal interface may be different than a diameter of the second metal interface.

A center of the first metal interface may be aligned with a center of the second metal interface.

The distance between the first metal interface and the second metal interface may correspond with a predetermined high-order mode frequency.

At least one of the first blind hole or the second blind hole may include a stepped hole.

A cross-sectional size of the stepped hole may decrease in an inward direction from the respective surface of the dielectric body.

According to an aspect of an embodiment, a multi-mode dielectric waveguide resonator may include a plurality of the dielectric waveguide resonators respectively including: a dielectric body and a metal plating layer wrapping an outer surface of the dielectric body; a metal interface provided in the dielectric body and connected to the metal plating layer, where the metal interface intersects a direction of an intrinsic electric field of the dielectric resonant cavity; and a blind hole recessed inwards from a surface of the dielectric body, wherein a bottom surface of the blind hole includes the metal interface, where an axial direction of the blind hole corresponds with the direction of the intrinsic electric field of the dielectric resonant cavity, and where the plurality of dielectric waveguide resonators are coupled through a coupling window.

The metal interface of a dielectric waveguide resonator may include a different shape than the metal interface of an adjacent dielectric waveguide resonator.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
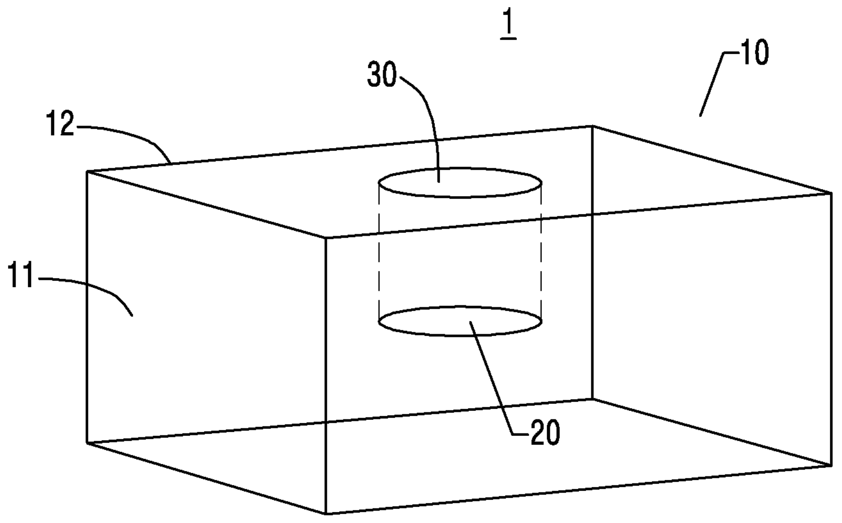
FIG. 1 is a schematic structural diagram of a dielectric waveguide resonator according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that any number of combinations of one or more of the listed items may be used, and only one item in the list may be needed. For example, "at least one of: A, B, and C" includes any of the following combinations: A, B, C, A and B, A and C, B and C, and A and B and C.

One or more functions described below may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

For a better understanding of the above-mentioned technical solutions, exemplary embodiments of the present application will now be described in detail below with reference to the accompanying drawings, however, the disclosure is not limited thereto and may be realized in various other forms.

One or more embodiments of the present application provide a dielectric waveguide resonator and a multi-mode dielectric waveguide resonator. By adding a metal loading interface in a dielectric body of the dielectric waveguide resonator, when a size, frequency and unloaded Q value of the dielectric waveguide resonator are kept constant, high-order mode harmonics may be pushed away, the performance of a low-pass filter may be improved, and the loss may be improved.

Figure 2A:
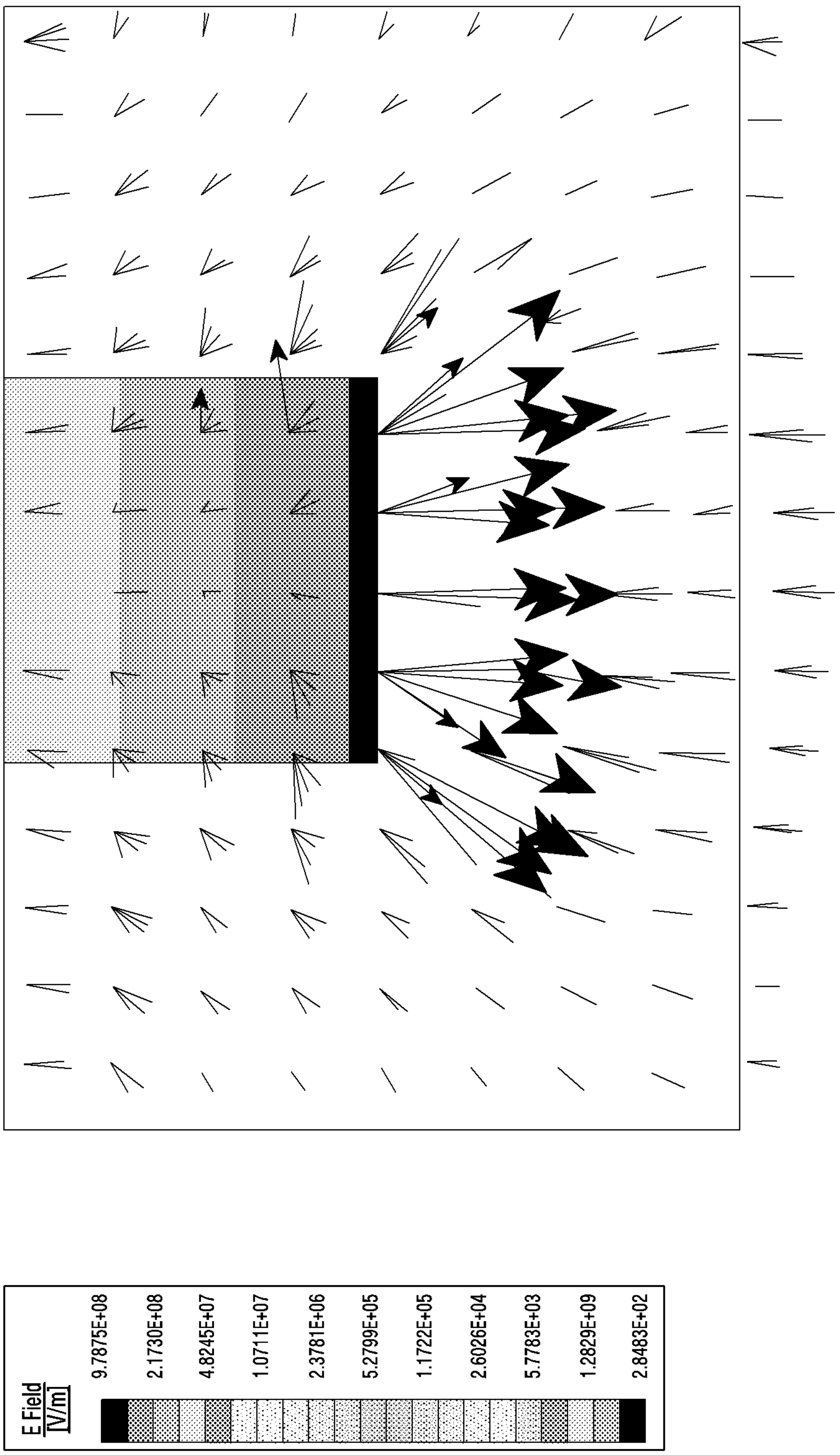
FIG. 2A and FIG. 2B are a dominant-mode frequency electric field vector diagram and a high-order mode frequency electric field vector diagram of the dielectric waveguide resonator according to an embodiment.
Figure 2B:
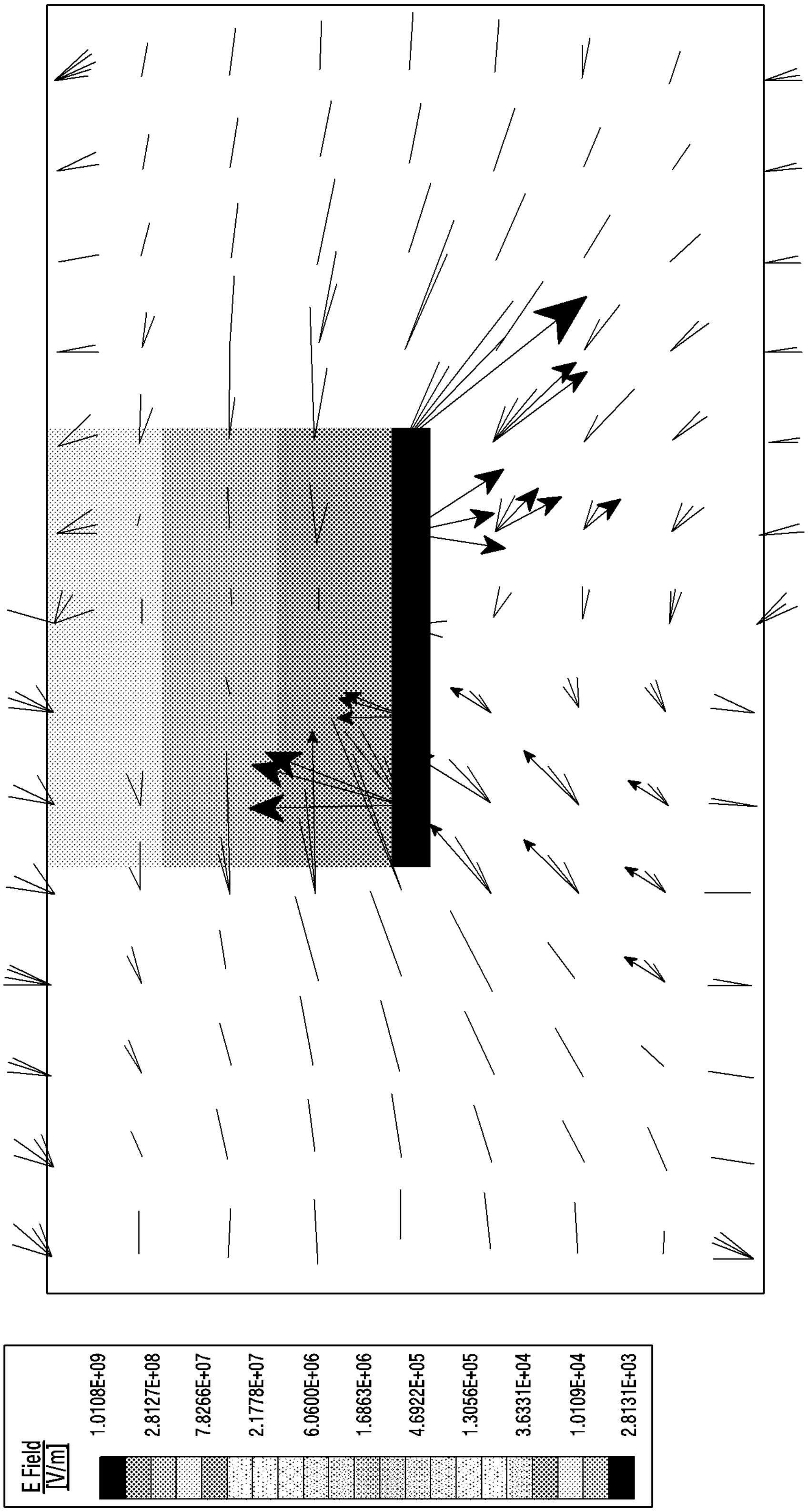

FIG. 1 is a schematic structural diagram of a dielectric waveguide resonator of the present disclosure. FIG. 2*a* and FIG. 2*b* are a dominant-mode frequency electric field vector diagram and a high-order mode frequency electric field vector diagram of the dielectric waveguide resonator of the present disclosure.

As shown in FIGS. 1 to 2*b*, a dielectric waveguide resonator 1 may include:

- a dielectric resonant cavity 10 including a dielectric body 11 and a metal plating layer 12 wrapping an outer surface of the dielectric body 11; and
- a metal loading interface 20 arranged in the dielectric body 11 and is connected to the metal plating layer 12.

The metal loading interface 20 may intersect an intrinsic electric field direction of the dielectric resonant cavity 10 to reduce a dominant-mode frequency of the dielectric resonant cavity 10.

In an embodiment shown in FIG. 1, the intrinsic electric field direction of the dielectric resonant cavity 10 may be a direction between a pair of opposite surfaces connected to the dielectric body 11 (as shown by the downward arrow direction in FIG. 2*a*). The metal loading interface 20 may be a metal surface located between the pair of opposite surfaces, which may intersect with the intrinsic electric field direction of the dielectric resonant cavity 10 and may be located at a position where a dominant mode of the dielectric resonant cavity 10 is the strongest, such that electro (magnetic) waves in the dielectric resonant cavity 10 oscillate between the metal loading interface 20 and one surface of the pair of surfaces rather than between the pair of surfaces. This may reduce an oscillation space of the electro (magnetic) waves and may form a capacitance loading structure in the dielectric resonant cavity 10. The existence of the metal loading interface 20 may not only change an oscillation distance of the electro (magnetic) waves, but may also change the direction of a local electric field, as shown in FIG. 2*a*, which decreases the dominant-mode frequency of the dielectric resonant cavity 10.

The metal loading interface 20 may be loaded at the position where the dominant mode of the dielectric resonant cavity 10 is the strongest. Because the setting of the metal loading interface 20 does not affect the size and structure of the dielectric body 11, it may not affect the size and unloaded Q value of the dielectric resonant cavity 10 itself. However, because the dominant-mode frequency of the dielectric resonant cavity 10 may be reduced to prolong a distance between the high-order mode frequency and the dominant-mode frequency, broadening of the bandwidth may be realized, which may improve the performance of the low-pass filter and improve the loss.

The dielectric resonant cavity 10 may further include:

a blind hole 30 which is recessed inwards from a surface of the dielectric body 11. A surface of the blind hole 30 may be covered with a metal plating layer; a bottom surface of the blind hole 30 located in the dielectric body 11 may include the metal loading interface 20. An axial direction of the blind hole 30 may be consistent with the intrinsic electric field direction of the dielectric resonant cavity 10.

The blind hole 30 may be one implementation of forming the metal loading interface 20 in the dielectric body 11. The blind hole 30 may not penetrate through the dielectric body 11 in the intrinsic electric field direction of the dielectric resonant cavity 10, but may form a spacing from a surface opposite to the surface from which the blind hole 30 is recessed. The spacing may be less than a distance (such as the length, width, and height of the dielectric body) between the pair of surfaces, thus forming a reduced oscillation space and changing the position of the dominant-mode frequency.

The axial direction of the blind hole 30 may be consistent with the intrinsic electric field direction of the dielectric resonant cavity 10, and a shape of the bottom surface, e.g., a cross-sectional shape of the blind hole 30, may be circular, elliptical, rectangular, square, etc., or a circular shape is shown in FIG. 1. The length (for example, the height) of the blind hole 30 in the axial direction may be associated with the position of the dominant-mode frequency of the dielectric resonant cavity 10.

The metal loading interface in the dielectric body 11 may be more than just one, and there may be a plurality of opposite metal loading interfaces in the dielectric body 11 to adjust an electric field oscillation space in the dielectric body 11.

Figure 3:
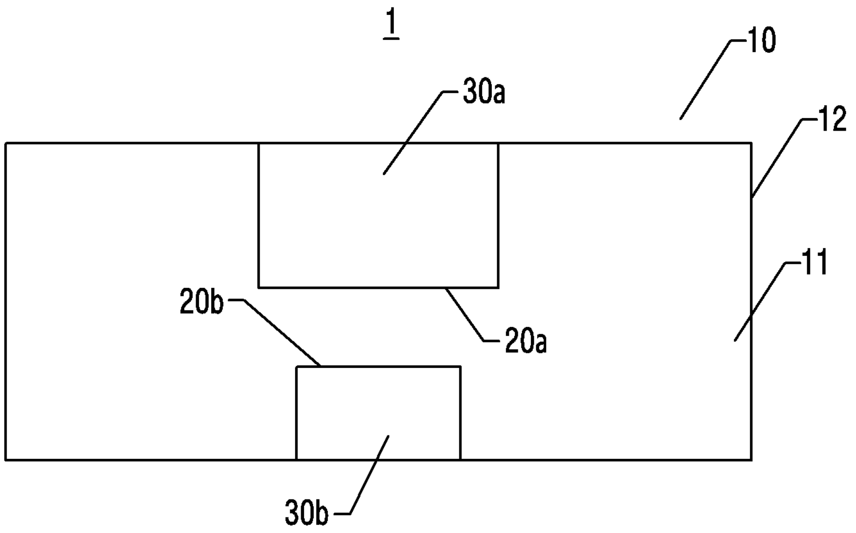
FIG. 3 is a schematic structural diagram of a dielectric waveguide resonator according to an embodiment.

As shown in FIG. 3, the blind hole 30 may include a first blind hole 30*a* and a second blind hole 30*b*. The first blind hole 30*a* and the second blind hole 30*b* may be respectively recessed inwards from a pair of opposite surfaces of the dielectric body 11, and the pair of opposite surfaces may be perpendicular to the intrinsic electric field direction of the dielectric resonant cavity 10.

A bottom surface of the first blind hole 30*a* located in the dielectric body 11 may be a first metal loading interface 20*a*, and a bottom surface of the second blind hole 30*b* located in the dielectric body 11 may be a second metal loading interface 20*b*. The first metal loading interface 20*a* and the second metal loading interface 20*b* may have a spacing therebetween and at least partially overlap each other, such as to form an electric field oscillation space between the first metal loading interface 20*a* and the second metal loading interface 20*b*.

According to an embodiment, one blind hole may be divided into a pair of blind holes respectively recessed from a pair of opposite surfaces, such that the height of the single blind hole may be reduced while achieving the same electric field oscillation space, and thereby increasing an adjustment range of the dielectric resonant cavity 10 and lowering the machining difficulty of the dielectric waveguide filter.

According to an embodiment, as shown in FIG. 3, diameters of the first metal loading interface 20*a* and the second metal loading interface 20*b* may be different. The centers of the first metal loading interface 20*a* and the second metal loading interface 20*b* may be aligned with each other and may overlap center points of the pair of opposite surfaces of the dielectric body 11.

Figure 4:
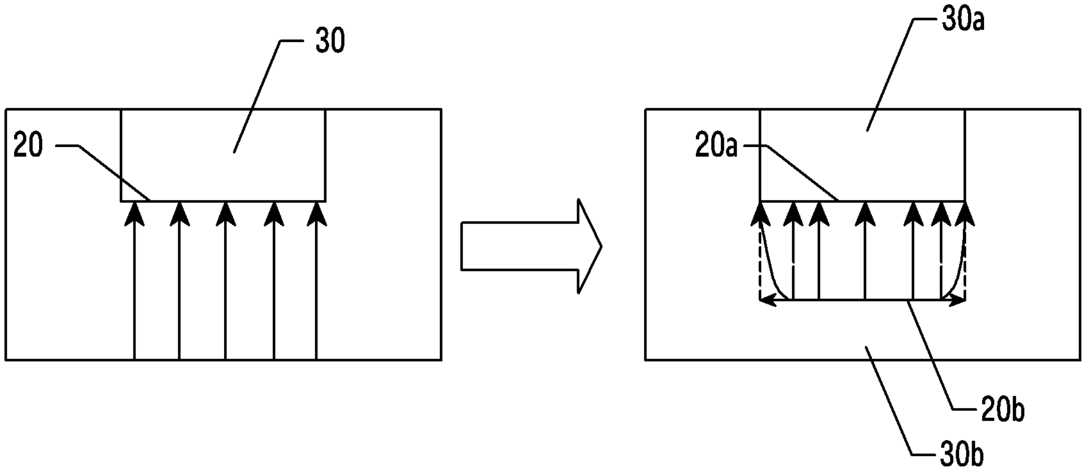
FIG. 4 is an electric field direction vector diagram of the dielectric waveguide resonator of FIG. 3 according to an embodiment.

As shown in FIG. 4, differently sized metal loading interfaces may form electric field directions, having angles with the intrinsic electric field direction (e.g., a dominant-mode direction) between edges of the first metal loading interface 20*a* and the second metal loading interface 20*b*. The directions obtained by orthogonal decomposition performed on the electric field directions may be conductive to enhancing components in the dominant-mode direction and pushing the high-order mode frequency away.

According to an embodiment, the spacing between a pair of metal loading interfaces may be associated with the position of the dominant-mode frequency. For example, if the spacing between one pair of metal loading interfaces is smaller, the position of the high-order mode frequency may be farther from the position of the dominant-mode frequency.

The cross-sectional size of the blind hole 30 may be selected such that the size (diameter) in the axial direction of the blind hole 30 is unchanged as shown in FIG. 1 and FIG. 3, or may be selected such that the size in the axial direction of the blind hole 30 may stepwise or progressively change. The cross-sectional size of the blind hole 30 may have an impact on the unloaded Q value of the dielectric resonant cavity 10. To prevent the blind hole from reducing the unloaded Q value of the dielectric resonant cavity 10, the cross-sectional size of the blind hole 30 may be reduced.

Figure 5:
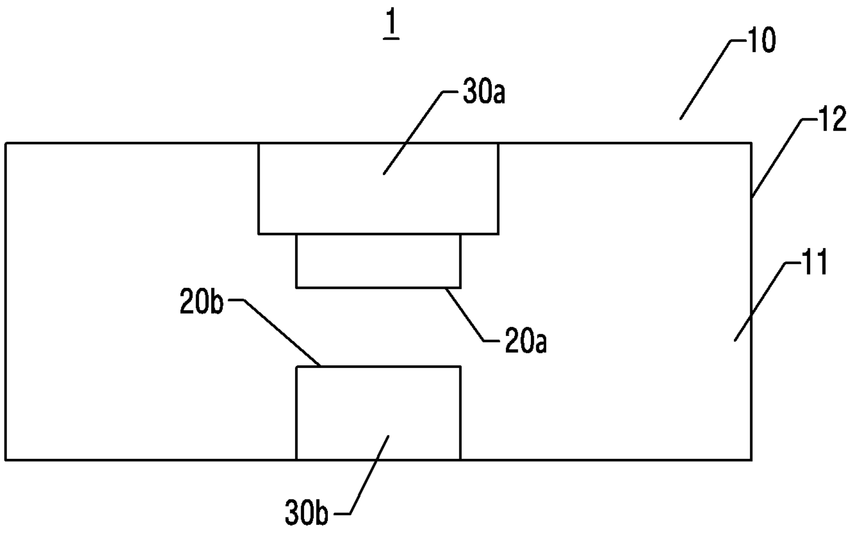
FIG. 5 is a schematic structural diagram of a dielectric waveguide resonator according to an embodiment.
Figure 6:
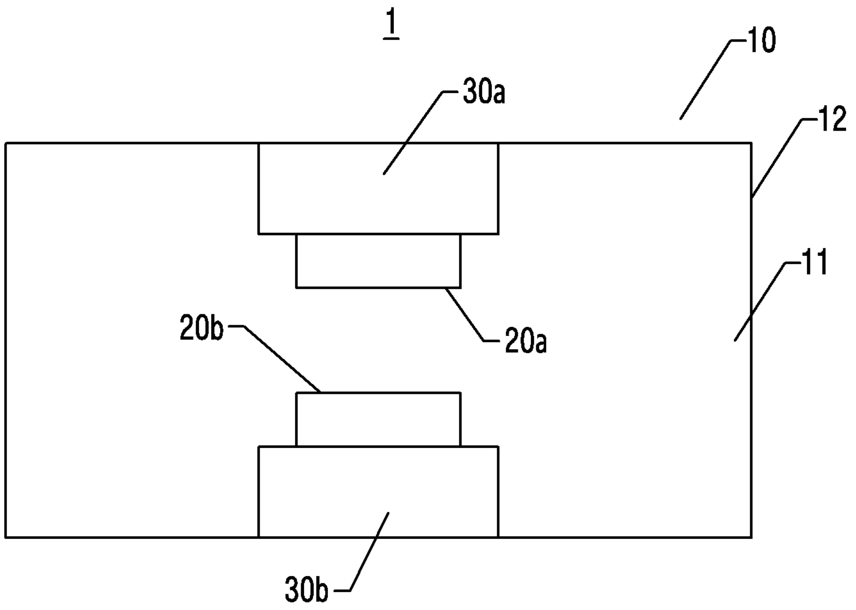
FIG. 6 is a schematic structural diagram of a dielectric waveguide resonator according to an embodiment.

For example, as shown in FIG. 5 and FIG. 6, at least one of the first blind hole 30*a* and the second blind hole 30*b* may be a stepped hole.

According to an embodiment and as shown in FIG. 5, the first blind hole 30*a* is a stepped hole, and the second blind hole 30*b* is a cylindrical hole having a constant cross-sectional size. As shown in FIG. 6, the first blind hole 30*a* and the second blind hole 30*b* may both be stepped holes.

Considering the convenience of machining and the impact of the cross-sectional size of the blind hole on the unloaded Q value, the cross-sectional size of the stepped hole may gradually decrease in a direction (the dominant-mode direction) inwards from the surface of the dielectric body 11.

When the blind hole is a stepped hole, its metal loading interface may be a cross section located at a bottom end of the blind hole and may have the smallest size. In the case of a single blind hole as shown in FIG. 1, the blind hole may also be realized in the form of a stepped hole.

As shown in FIG. 5 and FIG. 6, in one or more embodiments, the dielectric waveguide resonator may simultaneously decrease the dominant-mode frequency and push the high-order mode frequency away, by combination of a plurality of different parameters such as the number of blind holes, the cross-sectional size, and the cross-sectional shape. Furthermore, the diversification of adjustment methods may lead to expansion of a parameter adjustment range, and thereby achieve an improved performance without changing the size of the dielectric resonant cavity. The size of the resonant cavity may be substantially reduced under the same performance of the dielectric waveguide resonator of the present disclosure.

Figure 7:
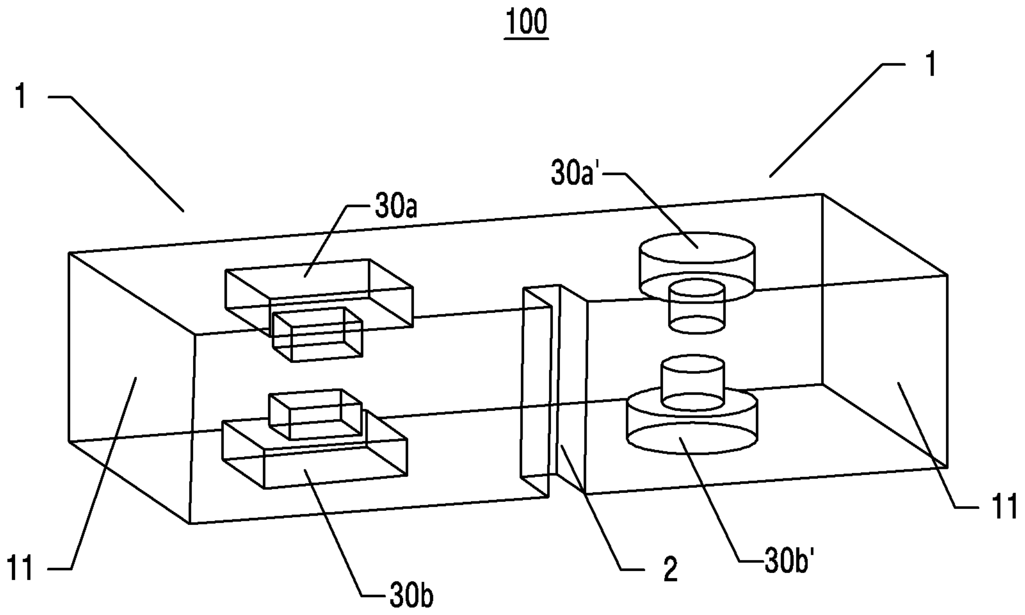
FIG. 7 is a schematic structural diagram of a multi-mode dielectric waveguide resonator according to an embodiment.

As shown in FIG. 7, in one or more embodiments, a multi-mode dielectric waveguide resonator 100 may include:

a plurality of the dielectric waveguide resonators 1 as shown in any one of FIG. 1, FIG. 3 to FIG. 6. Two adjacent dielectric waveguide resonators 1 may be coupled via a coupling window 2.

In one or more embodiments, the dielectric bodies 11 of two adjacent dielectric waveguide resonators 1 may be integrally formed, the outer surfaces of which may be covered with integrally connected metal plating layers. The coupling window 2 may be formed between two adjacent dielectric waveguide resonators 1 and may be a window recessed from the surfaces of the dielectric bodies 11. According to one or more embodiments, the surfaces on which the coupling windows 2 are formed may be different from or the same as the surfaces on which the blind holes 30 are formed.

According to one or more embodiments, two adjacent dielectric waveguide resonators 1 may be of different types. This may be implemented in a way such that their metal loading interfaces 20 are different in shape, that is, cross-sectional shapes of the blind holes 30 are different.

For example, in the example shown in FIG. 7, one of the dielectric waveguide resonators 1 may have a pair of stepped blind holes 30*a* and 30*b* with rectangular metal loading sections, and the other dielectric waveguide resonator 1 may have a pair of stepped blind holes 30*a*' and 30*b*' with circular metal loading sections.

Alternatively, two adjacent dielectric waveguide resonators 1 may be of different types, which may be implemented in a way that the numbers of their metal loading interfaces 20 are different. For example, one of the dielectric waveguide resonators 1 may have one metal loading interface and the other dielectric waveguide resonator 1 may have a pair of metal loading interfaces.

Alternatively, two adjacent dielectric waveguide resonators 1 may be of different types, which may be implemented in a way that their metal loading interfaces 20 are different in size, etc.

The difference in the types of two adjacent dielectric waveguide resonators 1 may avoid coupling of the dominant-mode frequencies of the two dielectric waveguide resonators 1.

In the dielectric waveguide resonator and the multi-mode dielectric waveguide resonator of the present disclosure, the intrinsic electric field direction of the dielectric resonant cavity is a direction connected between one pair of opposite surfaces of the dielectric body. The metal loading interface is a metal surface located between the pair of opposite surfaces, which intersects the intrinsic electric field direction of the dielectric resonant cavity and is located at a position where a dominant mode of the dielectric resonant cavity is the strongest, such that electro (magnetic) waves in the dielectric resonant cavity oscillate between the metal loading interface and one surface of the pair of surfaces rather than between the pair of surfaces, thereby reducing an oscillation space of the electro (magnetic) waves and forming a capacitance loading structure in the dielectric resonant cavity. The existence of the metal loading interface may not only change an oscillation distance of the electro (magnetic) waves, but may also change the direction of a local electric field, and decreases the dominant-mode frequency of the dielectric resonant cavity 10.

The metal loading interface may be loaded at the position where the dominant mode of the dielectric resonant cavity is the strongest. Since the setting of the metal loading interface may not affect the size and structure of the dielectric body, it may not affect the size and unloaded Q value of the dielectric resonant cavity itself. However, since the dominant-mode frequency of the dielectric resonant cavity 10 may be reduced to prolong a distance between the high-order mode frequency and the dominant-mode frequency, broadening of the bandwidth may be realized, thereby improving the performance of the low-pass filter and improving the loss.

Aspects of the present disclosure provide efficient communication methods in a wireless communication system.

Although the general principles of the present application have been described above in connection with specific embodiments, it should be noted that the advantages, benefits, effects, etc. mentioned in the present application are merely examples and are not restrictive, and these advantages, benefits, effects, etc. must be possessed by the various embodiments of the present application. Furthermore, the specific details disclosed above are for purposes of example and explanation only and are not intended to be restrictive, and the details disclosed above are not intended to limit the present application to be implemented by using the above specific details.

The block diagrams of devices, apparatus, equipment, and systems referred to in the present application are merely illustrative examples and are not intended to require or imply that connections, arrangements, and configurations must be made in manners shown in the block diagrams. These devices, apparatus, equipment, and systems can be connected, arranged, and configured in any manner, as will be appreciated by those skilled in the art. Words such as "including", "comprising", "having", and the like are open-ended terms that mean "including, but not limited to", and are used interchangeably therewith. The words "or" and "and" as used herein refer to the word "and/or" and may be used interchangeably therewith unless the context clearly dictates otherwise. As used herein, the word "such as" means the phrase "such as, but not limited to", and is used interchangeably therewith.

It is also noted that in the apparatuses, devices, and methods of the present application, the components or steps may be disassembled and/or recombined. Such disassembling and/or recombination should be considered as equivalent solutions to the present application.

The previous descriptions of the disclosed aspects are provided to enable any person skilled in the art to make or use the present application. Various modifications to these aspects will be readily apparent to those skilled in the art, and the general principles defined herein may be applied to other aspects without departing from the scope of the present application. Thus, the present application is not intended to be limited to the aspects shown herein, but is to be in accordance with the widest scope consistent with the principles and novel features disclosed herein.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A dielectric waveguide resonator, comprising:

a dielectric resonant cavity comprising a dielectric body and a metal plating layer wrapping an outer surface of the dielectric body;

a blind hole recessed inwards from the outer surface of the dielectric body; and a metal interface included in a surface of the blind hole and connected to the metal plating layer, wherein the metal interface intersects a direction of an intrinsic electric field of the dielectric resonant cavity, and wherein the metal interface is located at a position at which a dominant mode of the dielectric resonant cavity is strongest, such that electromagnetic waves in the dielectric resonant cavity oscillate between the metal interface and a first surface of the dielectric body.

2. The dielectric waveguide resonator of claim 1, wherein an axial direction of the blind hole corresponds with the direction of the intrinsic electric field of the dielectric resonant cavity.

3. A multi-mode dielectric waveguide resonator comprising:

a plurality of dielectric waveguide resonators respectively comprising:

a dielectric resonant cavity comprising a dielectric body and a metal plating layer wrapping an outer surface of the dielectric body;

a blind hole recessed inwards from the outer surface of the dielectric body; and a metal interface included in a surface of the blind hole and connected to the metal plating layer, wherein the metal interface is located at a position at which a dominant mode of the dielectric resonant cavity is strongest, such that electromagnetic waves in the dielectric resonant cavity oscillate between the metal interface and a first surface of the dielectric body, wherein the metal interface intersects a direction of an intrinsic electric field of the dielectric resonant cavity, wherein an axial direction of the blind hole corresponds with the direction of the intrinsic electric field of the dielectric resonant cavity, and wherein the plurality of dielectric waveguide resonators are coupled through a coupling window.

4. The multi-mode dielectric waveguide resonator of claim 3, wherein the metal interface of a dielectric waveguide resonator comprises a different shape than the metal interface of an adjacent dielectric waveguide resonator.

* * * * *